US008500865B2

(12) United States Patent
Bouillon et al.

(10) Patent No.: US 8,500,865 B2
(45) Date of Patent: Aug. 6, 2013

(54) GAS DEACIDIZING METHOD USING AN ABSORBENT SOLUTION WITH DEMIXING DURING REGENERATION

(75) Inventors: Pierre-Antoine Bouillon, Lyons (FR); Marc Jacquin, Lyons (FR); Alain Methivier, Lyons (FR)

(73) Assignee: IFP, Rueil-Malmaison Cedex (FR)

( * ) Notice: Subject to any disclaimer, the term of this patent is extended or adjusted under 35 U.S.C. 154(b) by 826 days.

(21) Appl. No.: 12/622,476

(22) Filed: Nov. 20, 2009

(65) Prior Publication Data

US 2010/0132551 A1    Jun. 3, 2010

(30) Foreign Application Priority Data

Nov. 20, 2008  (FR) ...................................... 08 06511

(51) Int. Cl.
*B01D 53/14*    (2006.01)

(52) U.S. Cl.
USPC .................. 95/181; 95/183; 95/193; 95/206; 95/209; 95/235; 95/236; 423/228

(58) Field of Classification Search
None
See application file for complete search history.

(56) References Cited

U.S. PATENT DOCUMENTS

| 5,157,202 | A | * | 10/1992 | Bauer et al. | 585/833 |
| 2009/0199709 | A1 | * | 8/2009 | Rojey et al. | 95/46 |
| 2010/0011958 | A1 | * | 1/2010 | Cadours et al. | 95/187 |

FOREIGN PATENT DOCUMENTS

| FR | 2 877 858 A1 | 5/2006 |
| FR | 2 898 284 A1 | 9/2007 |
| FR | 2 900 841 A1 | 11/2007 |
| FR | 2 900 843 A1 | 11/2007 |

\* cited by examiner

*Primary Examiner* — Duane Smith
*Assistant Examiner* — Pankti Patel
(74) *Attorney, Agent, or Firm* — Antonelli, Terry, Stout & Kraus, LLP.

(57) ABSTRACT

The gaseous effluent to be treated is contacted in C1 with an absorbent solution selected for its property of forming two separable phases when it has absorbed an amount of acid compounds and when it is heated.
According to the invention, the absorbent solution is regenerated in at least two stages in regeneration zones Z1 and Z2. At the end of the first regeneration stage in Z1, at least part of the partly regenerated absorbent solution is separated into two fractions in B1: a fraction rich in acid compounds and a fraction depleted in acid compounds. Fraction 10 rich in acid compounds is sent to the second regeneration stage in Z2. The fraction depleted in acid compounds and regenerated absorbent solution 6 from the second regeneration stage are recycled to absorption column C1.
The method can be applied to combustion fumes decarbonation and to natural gas or synthesis gas deacidizing.

21 Claims, 6 Drawing Sheets

GAS DEACIDIZING METHOD USING AN ABSORBENT SOLUTION WITH DEMIXING DURING REGENERATION

FIELD OF THE INVENTION

The present invention relates to the field of deacidizing a gaseous effluent by means of an absorbent solution.

The method according to the invention allows to remove acid compounds such as carbon dioxide ($CO_2$) and hydrogen sulfide ($H_2S$) contained in a gaseous effluent. It can be applied for treating a natural gas, a synthesis gas or fumes from a combustion process.

Regeneration of the absorbent solution laden with acid compounds is costly, notably as regards energy consumption. This is a major drawback, notably when the absorbent solution is used to capture the $CO_2$ present in combustion fumes. In fact, if the heat required to regenerate the absorbent solution is obtained by combustion of a fossil fuel, an additional amount of $CO_2$ may be produced, which would make the capture of $CO_2$ by absorption uninteresting.

BACKGROUND OF THE INVENTION

Document FR-2,898,284 aims to use a demixing absorbent solution having the property of splitting up when said absorbent solution laden with acid compounds is heated. The solution divides into two phases: a fraction rich in acid compounds and a fraction poor in acid compounds. Thus, document FR-2,898,284 aims to regenerate by distillation only the fraction that is enriched in acid compounds in order to minimize the energy required for regeneration of the absorbent solution.

The present invention aims to exploit the properties of the demixing solution described in document FR-2,898,284 by carrying out, during regeneration, a stage of separation of the absorbent solution into two fractions so as to discharge a portion of the absorbent solution depleted in acid compounds.

SUMMARY OF THE INVENTION

In general terms, the invention describes a method of deacidizing a gaseous effluent comprising at least one acid compound of the group made up of hydrogen sulfide ($H_2S$) and carbon dioxide ($CO_2$), wherein the gaseous effluent is contacted with an absorbent solution in a contacting zone so as to obtain a gaseous effluent depleted in acid compounds and an absorbent solution laden with acid compounds, the absorbent solution being selected for its property of forming two separable liquid phases when it has absorbed an amount of acid compounds and it is heated, and the absorbent solution laden with acid compounds is regenerated by carrying out the following stages:

a) distilling at least part of the absorbent solution laden with acid compounds into a first regeneration zone so as to produce a partly regenerated absorbent solution, b) withdrawing at least part of the partly regenerated absorbent solution from the first regeneration zone and dividing the solution withdrawn into a fraction enriched in acid compounds and a fraction depleted in acid compounds, c) distilling said fraction enriched in acid compounds obtained in stage b) into a second regeneration zone so as to produce a regenerated absorbent solution, d) recycling at least said fraction depleted in acid compounds and said regenerated absorbent solution to the contacting zone.

According to the invention, during stage c), at least one complementary stage of withdrawing at least part of the absorbent solution circulating in the second regeneration zone can be carried out, the absorbent solution withdrawn can be separated into a liquid enriched in acid compounds and a liquid depleted in acid compounds, the liquid depleted in acid compounds can be recycled to the contacting zone and the liquid enriched in acid compounds can be fed again into the second contacting zone.

The first and second regeneration zones can be arranged in a regeneration column. In this case, stage b) can be performed in a device arranged within said regeneration column.

Alternatively, the first regeneration zone can be arranged in a first column and the second regeneration zone can be arranged in a second column.

Prior to carrying out stage a), the absorbent solution laden with acid compounds can be heated, then a stream depleted in acid compounds can be separated from the absorbent solution and the stream can be recycled by feeding it into the contacting zone.

The absorbent solution laden with acid compounds can be heated to a temperature ranging between 50° C. and 150° C.

In the first regeneration zone and in the second regeneration zone, the absorbent solution can be distilled so as to produce a regenerated absorbent solution depleted in acid compounds by releasing acid compounds in gaseous form.

The contacting zone can consist of a column provided with means for contacting a gas and a liquid and, in stage d), the fraction depleted in acid compounds and the regenerated absorbent solution can be introduced at the top of the column.

The pressure of said fraction enriched in acid compounds can be increased by pumping so that the second regeneration zone operates at a higher pressure than the first regeneration zone.

The second regeneration zone can operate at a higher temperature than the first regeneration zone.

In stage b), one of the following separation techniques can be used: decantation, centrifugation, filtration.

The absorbent solution can comprise a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

The gaseous effluent can be selected from the group made up of natural gas, synthesis gas, combustion fumes, refinery gas, Claus tail gas, biomass fermentation gas.

Withdrawing a portion of the absorbent solution during regeneration allows to reduce the flow rate of the absorbent solution to be regenerated and therefore to decrease the energy required for regeneration.

BRIEF DESCRIPTION OF THE FIGURES

Other features and advantages of the invention will be clear from reading the description hereafter, with reference to the accompanying figures wherein.

DETAILED DESCRIPTION

Figure 1:
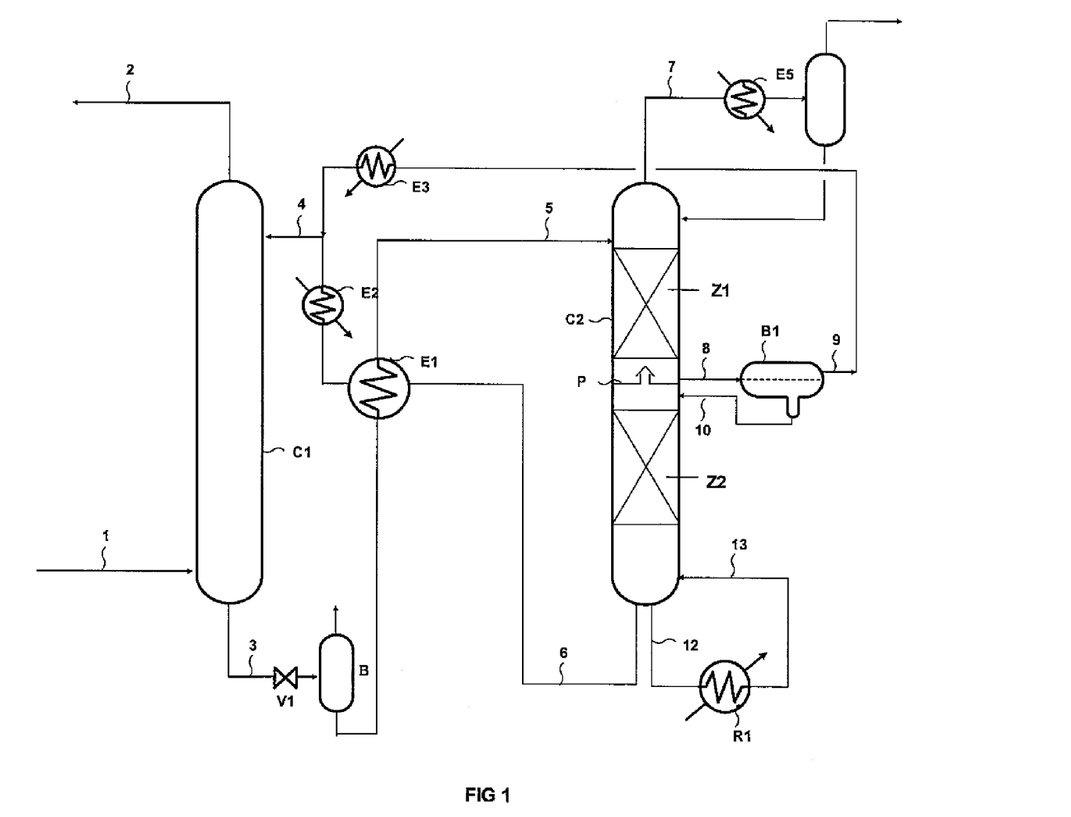
FIG. 1 shows an embodiment of the method according to the invention.

In FIG. 1, the gaseous effluent to be deacidized circulating in line 1 is contacted in absorption column C1 with the absorbent solution flowing in through line 4. Column C1 is equipped with gas/liquid contacting internals, for example distillation trays, random or stacked packings. The deacidizing method according to the invention can be applied to various gaseous effluents. For example, the method allows to decarbonate combustion fumes, to deacidize natural gas or a Claus tail gas. The method also allows to remove the acid compounds contained in synthesis gas, in conversion gas in integrated coal or natural gas combustion plants, and in the gas resulting from biomass fermentation.

In column C1, the reactive compounds of the absorbent solution react with the acid compounds to be collected so as to form a salt soluble in the solution. The gas depleted in acid compounds is discharged from C1 through line 2. The absorbent solution enriched in acid compounds, in form of salts dissolved in water, is discharged from C1 through line 3. This absorbent solution enriched in acid compounds however comprises a proportion of unreacted reactive compounds that may be significant.

The absorbent solution is an aqueous solution comprising one or more reactive compounds or having a physico-chemical affinity with acid compounds. An absorbent solution comprising compounds that react in a reversible manner with acid compounds such as $H_2S$ and $CO_2$ is preferably selected. According to the invention, one selects a reactive compound having the property of forming, in the aqueous phase, two separable liquid phases when it has absorbed a predetermined amount of acid compounds and when the temperature is above a critical temperature. In other words, the reactive compound is selected in such a way that the absorbent solution laden with acid compounds forms two liquid phases when its temperature exceeds a critical demixing temperature, i.e. a temperature threshold. The composition of the absorbent solution used in the method according to the invention is detailed hereafter.

In reference to FIG. 1, the absorbent solution circulating in line 3 can be expanded through expansion device V1 so as to vaporize part of the acid compounds absorbed and possibly co-absorbed hydrocarbons if the method according to the invention is used for natural gas deacidizing. The vapour fraction produced by the expansion in V1 is separated from the absorbent solution and discharged at the top of drum B. Depending on its composition, this vapour fraction can be recycled upstream from the process, used as fuel gas or mixed with the stream circulating in line 7. Alternatively, notably in cases where the method according to the invention is applied to combustion fumes decarbonation, absorbent solution 3 may undergo no expansion and separation. In this case, line 3 is directly connected to exchanger E1.

The absorbent solution is then sent to heat exchanger E1. It leaves the exchanger at a higher temperature through line 5. In heat exchanger E1, the absorbent solution laden with acid compounds is heated until a higher temperature than the critical temperature at which the solution laden with acid compounds forms two separable liquid phases is reached. For example, the absorbent solution laden with acid compounds is heated to a temperature ranging between 50° C. and to 150° C., preferably between 70° C. and 120° C.

The absorbent solution from E1 is fed through line 5 into column C2 to be regenerated. Column C2 is equipped with a reboiler R1 and with gas/liquid contacting internals. In C2, the reactive compounds of the absorbent solution are separated from the acid compounds. The acid compounds are released in gaseous form and discharged from C2 through line 7. Steam stream 7 rich in acid compounds is partly condensed by cooling and the condensates are sent to the top of C2 as reflux. Part of the absorbent solution is withdrawn at the bottom of column C2 through line 12 to be heated by reboiler R1 and fed again into the bottom of column C2 through line 13. The regenerated absorbent solution is collected at the bottom of column C2 through line 6. Depending on the properties of the absorbent solution, the critical demixing temperature is reached by heating in E1 or during regeneration in C2.

According to the invention, during the regeneration carried out in C2, at least a portion of absorbent solution in two-phase form is withdrawn and said portion is separated into two fractions: a fraction depleted in acid compounds and a fraction enriched in acid compounds. This separation is possible owing to the particular characteristic of the absorbent solution that has the property of forming two separable liquid phases when it has absorbed a predetermined amount of acid compounds and when the temperature is above a critical temperature. In fact, during the regeneration stage carried out in C2, the absorbent solution is gradually heated by steam from the column reboiling performed by R1. The temperature of the absorbent solution thus increases as it progresses towards the bottom of column C2. Besides, the absorbent solution becomes depleted in acid compounds as it progresses in C2 through regeneration effect. In other words, the salts formed by reaction of the reactive compounds of the absorbent solution with the acid compounds in C1 decompose in C2 while releasing the acid compounds in gas form and producing regenerated reactive compounds. When the temperature of the absorbent solution is above the critical temperature and the proportion of regenerated reactive compounds is sufficient, two separable phases appear.

In reference to FIG. 1, column C2 comprises two contacting zones Z1 and Z2 for contacting the steam generated by reboiler R1 with the absorbent solution flowing in through line 5. Z1 and Z2 are provided with distillation trays, random or stacked packings. Zones Z1 and Z2 are separated by collection tray P. The absorbent solution fed into C2 through line 5 flows along zone Z1 to collection tray P. A portion or all of the liquid collected by tray P is fed through line 8 into separation device B1, a separating drum for example. Considering the effect of the temperature rise in column C2 and of the acid compound depletion, the absorbent solution collected by tray P is under conditions favourable to a phase separation. Preferably, the stage of separation by demixing is carried out when the absorbent solution has released at least 10 mol %, preferably at least 20 mol % of the acid compounds it contained before entering first contacting zone Z1. In other words, the acid compound content of the absorbent solution withdrawn through line 8 is at least 10 mol % lower, preferably at least 20 mol % lower than the composition of the absorbent solution flowing into Z1 through line 5.

Collection tray P is equipped with chimneys allowing passage of the gas from zone Z2 to zone Z1. Collection tray P can optionally be to equipped with downcomers so that part of the liquid collected by tray P can be directly distributed in zone Z2 without being withdrawn through line 8.

In device B1, the absorbent solution can be separated by decantation, centrifugation of filtration. In B1, the absorbent solution is separated into a first liquid fraction enriched in acid compounds, i.e. enriched in active compounds that have reacted with the acid compounds, and into a second liquid fraction depleted in acid compounds, i.e. enriched in unreacted active compounds.

The second liquid fraction depleted in acid compounds is discharged from B1 through line 9, cooled by heat exchanger E3 and fed through line 4 into absorption column C1.

The first liquid fraction enriched in acid compounds is discharged from B1 through line 10 and fed into C2 at the top of zone Z2 in order to continue its regeneration. The regenerated absorbent solution is discharged at the bottom of column C2 through line 6.

The position of withdrawal line 8 is notably selected according to the temperature evolution undergone by the absorbent solution in C2 under the effect of reboiling R1 and of the reflux introduced at the top of C2.

The heat released by cooling the absorbent solution collected at the bottom of column C2 can be recovered in order to heat various streams to be regenerated. For example, in reference to FIG. 1, the absorbent solution circulating in line 6 allows to heat, in heat exchanger E1, the absorbent solution laden with acid compounds circulating in line 3. This solution is then cooled by exchanger E2 to the operating temperature of column C1 prior to being fed into C1 through line 4.

The nature of the reactive compounds of the absorbent solution can be selected depending on the nature of the acid compound(s) to be treated to allow a reversible chemical reaction with the acid compound(s) to be treated. The chemical structure of the reactive compounds can also be selected so as to furthermore obtain increased stability of the absorbent solution under the conditions of use.

The reactive compounds can be, by way of non limitative example, (primary, secondary, tertiary, cyclic or not, aromatic or not, saturated or not) amines, alkanolamines, polyamines, amino-acids, amino-acid to alkaline salts, amides, ureas, alkali metal phosphates, carbonates or borates.

For example, the following reactive compound can be used: N,N,N',N'-Tetramethylhexane-1,6-diamine, commonly referred to as TMHDA.

The reactive compounds can be in variable concentration, for example ranging between 10 wt. % and 90 wt. %, preferably between 15 wt. % and 60 wt. %, more preferably between 20 wt. % and 50 wt. %, in the aqueous solution.

The absorbent solution can contain between 10 wt. % and 90 wt. % of water.

In an embodiment, the reactive compounds of the absorbent solution can be mixed with another amine, containing at least one primary or secondary amine function so as to act as an activator. The absorbent solution can contain activator up to a concentration of 20 wt. %, preferably less than 15 wt. % and more preferably less than 10 wt. %.

This type of formulation is particularly interesting in the case of $CO_2$ capture in industrial fumes, or treatment of natural gas containing $CO_2$ above the desired specification. In fact, for this type of application, one wants to increase the $CO_2$ capture kinetics in order to reduce the size of the equipments.

A non-exhaustive list of compounds that can be used as activators is given below:
 MonoEthanolAmine,
 AminoEthylEthanolAmine,
 DiGlycolAmine,
 Piperazine,
 N-(2-HydroxyEthyl)piperazine,
 N-(2-AminoEthyl)piperazine,
 N-Methylpiperazine,
 N-Ethylpiperazine,
 N-Propylpiperazine,
 1,6-HexaneDiAmine,
 1,1,9,9-TetraMethylDiPropyleneTriamine,
 Morpholine,
 Piperidine,
 3-(MethylAmino)PropylAmine,
 N-MethylBenzylAmine, In an embodiment, the absorbent solution, in particular an absorbent solution based on N,N,N',N'-Tetramethylhexane-1,6-diamine, can also contain other organic compounds. Thus, the absorbent solution according to the invention can contain organic compounds that are not reactive towards acid compounds (commonly referred to as "physical solvent") and that allow to increase the solubility of at least one or more acid compounds of the gaseous effluent. For example, the absorbent solution can comprise between 5 wt. % and 50 wt. % of physical solvent such as alcohols, glycol ethers, lactames, N-alkylated pyrrolidones, N-alkylated piperidones, cyclotetramethylenesulfones, N-alkylformamides, N-alkylacetamides, ether-ketones or alkyl phosphates and derivatives thereof. By way of non limitative example, it can be methanol, tetraethyleneglycoldimethylether, sulfolane or N-formyl morpholine.

In an embodiment, the absorbent solution, in particular an absorbent solution based on N,N,N',N'-Tetramethylhexane-1,6-diamine, can also comprise an organic or inorganic acid. A non-exhaustive list of acid compounds that can be used is given below:
 formic acid
 oxalic acid
 acetic acid
 propanoic acid
 butanoic acid
 amino-acid (Glycine, Taurine, etc.)
 phosphoric acid
 phosphorous acid
 pyrophosphoric acid
 sulfuric acid
 sulfurous acid
 nitrous acid
 hydrochloric acid.

Figure 6:
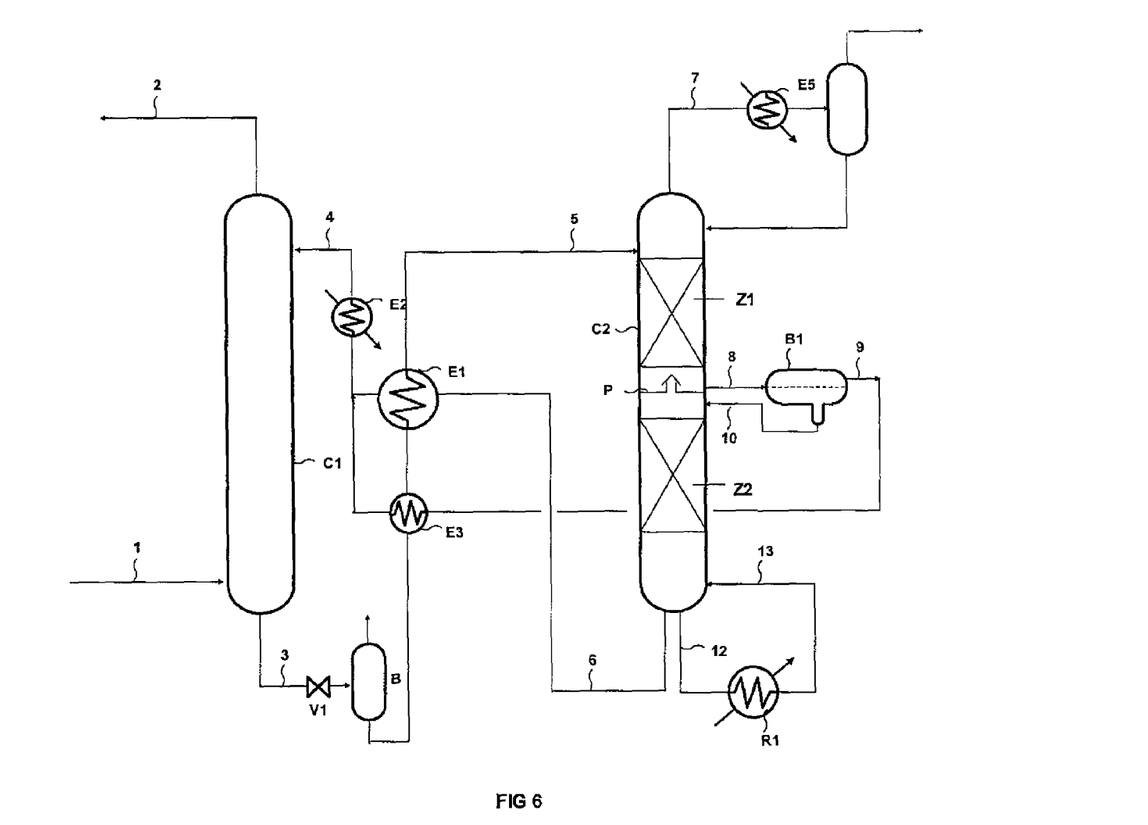

The method diagrammatically shown in FIG. 1 can be optimized by carrying out a thermal integration, as shown in FIG. 6, in order to improve the energy gain of the method. The reference numbers of FIG. 6 identical to those of FIG. 1 designate the same elements. In FIG. 6, stream 9 is cooled in E3 through heat exchange with the laden absorbent solution from B. Thus, E3 performs preheating of the $CO_2$-laden solution before it is fed into column C2.

Figure 2:
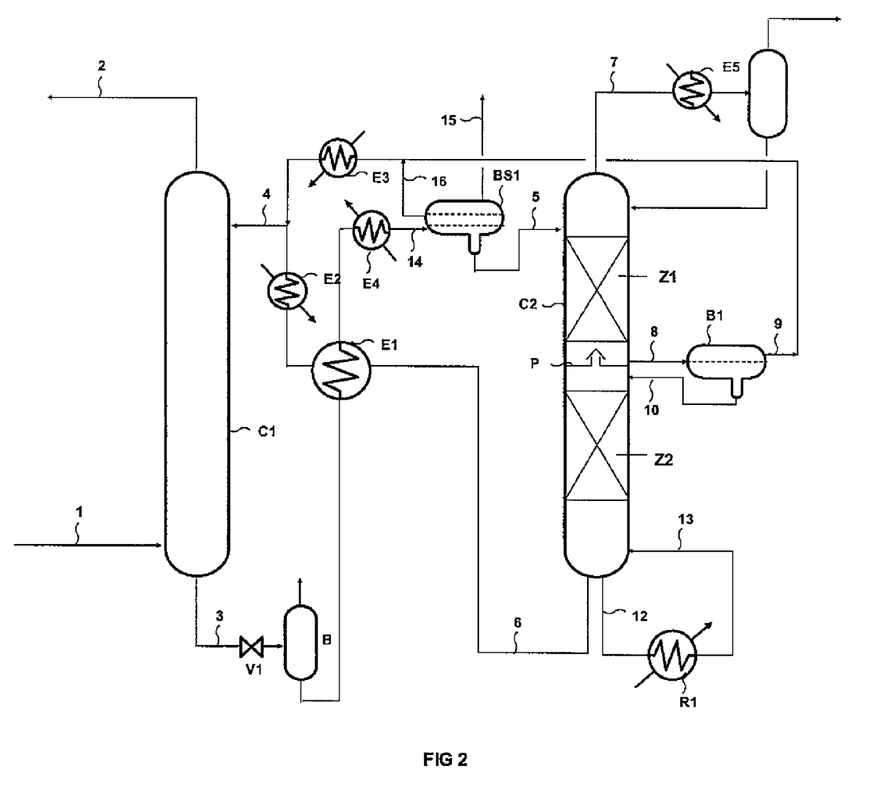
FIGS. 2 and 6 diagrammatically show variants of the method of FIG. 1.

The process diagrammatically shown in FIG. 1 can be complemented by carrying out an absorbent solution separation stage upstream from column C2, as shown in FIG. 2. The reference numbers of FIG. 2 identical to those of FIG. 1 designate the same elements.

The absorbent solution laden with acid compounds obtained at the bottom of C1 is heated in E1, then in exchanger E4. It leaves E4 through line 14 at a higher temperature. In exchangers E1 and E4, the absorbent solution laden with acid compounds is heated until the critical temperature at which the solution laden with acid compounds forms two separable phases is exceeded. For example, the absorbent solution laden with acid compounds is heated to a temperature ranging between 50° C. and 150° C., preferably between 70° C. and 120° C. Thus, the fluid circulating in line 14 consists of two separable liquid phases: a phase rich in acid compounds and a phase poor in acid compounds. Furthermore, under the effect of the temperature rise, part of the acid compounds is released in gas form. The three phases of the fluid circulating in line 14 are separated in separating drum BS1. For example, the two liquid phases are separated in BS1 by decantation, centrifugation or filtration. The gas fraction at the top of BS1 is extracted through line 15 and possibly mixed with stream 7. A first liquid fraction enriched in acid compounds, i.e. enriched in active compounds that have reacted with the acid compounds, is sent through line 5 to regeneration column C2. A second liquid fraction depleted in acid compounds, i.e. enriched in unreacted active compounds, is discharged from BS1 through line 16 and fed into column C1, for example mixed with the absorbent solution portion circulating in line 9.

According to the invention, several absorbent solution withdrawals can be carried out during regeneration.

Figure 3:
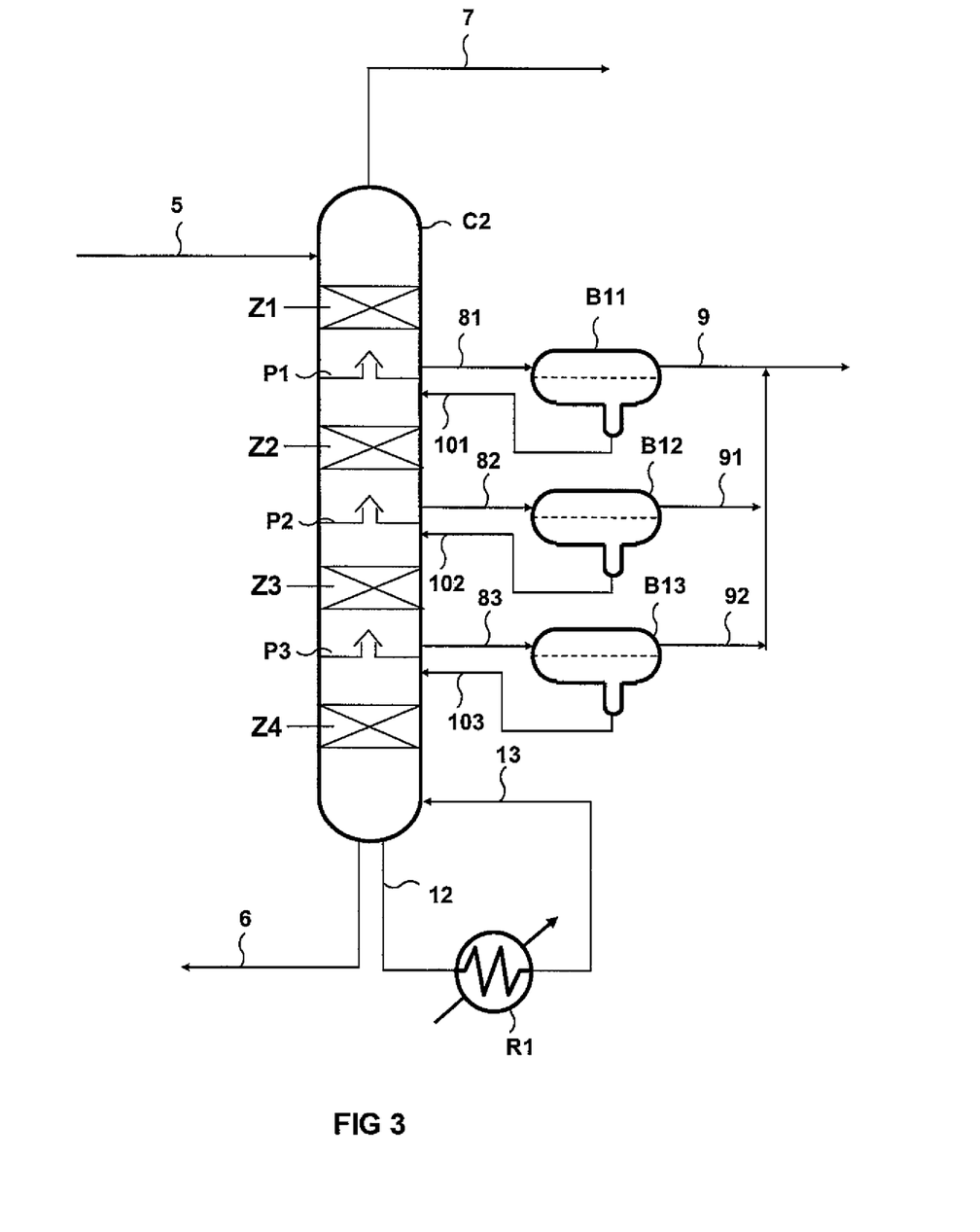
FIGS. 3, 4 and 5 show particular embodiments of the regeneration zone according to the invention.

FIG. 3 shows an embodiment of column C2 used in the processes described in reference to FIGS. 1, 2 and 6, wherein three absorbent solution withdrawals are performed.

In reference to FIG. 3, column C2 comprises four distinct contacting zones Z1, Z2, Z3 and Z4 arranged in such a way that the absorbent solution passes successively from one zone to the next. Each zone is separated from the previous one by one of the collection trays P1, P2 and P3. The collection trays are equipped with chimneys to allow ascending passage of the gas from the contacting zone located upstream to the contacting zone located downstream. The collection trays can be optionally equipped with downcomers so that part of the liquid collected can be directly distributed in the contacting zone located downstream.

The absorbent solution fed into C2 through line 5 circulates through zone Z1, then it is collected by tray P1. Line 81 withdraws at least part of the liquid collected by P1 and feeds it into separation device B11. Line 9 allows to discharge from B11 a fraction of solution depleted in acid compounds. Line 101 sends the absorbent solution fraction laden with acid compounds from drum B11 to C2 at the top of contacting zone Z2.

The absorbent solution fed into C2 through line 101 circulates through zone Z2, then it is collected by tray P2. Line 82 withdraws at least part of the liquid collected by P2 and feeds it into separation device B12. Line 91 allows to discharge from B12 a solution fraction depleted in acid compounds. Line 102 sends the absorbent solution fraction laden with acid compounds from drum B12 to C2 at the top of contacting zone Z3.

The absorbent solution fed into C2 through line 102 circulates through zone Z3, then it is collected by tray P3. Line 83 withdraws at least part of the liquid collected by P3 and feeds it into separation device B13. Line 92 allows to discharge from B13 a solution fraction depleted in acid compounds. Line 103 sends the absorbent solution fraction laden with acid compounds from drum B13 to C2 at the top of contacting zone Z4.

The regenerated solution obtained at the bottom of contacting zone Z4 is sent through line 6 to absorption column C1.

The fractions of absorbent solution depleted in acid compounds discharged through lines 91 and 92 are assembled with the fraction arriving through line 9 in order to be sent to column C1.

The regeneration carried out according to the diagram of FIG. 3 allows to discharge three absorbent solution fractions through lines 9, 91 and 92.

Figure 4:
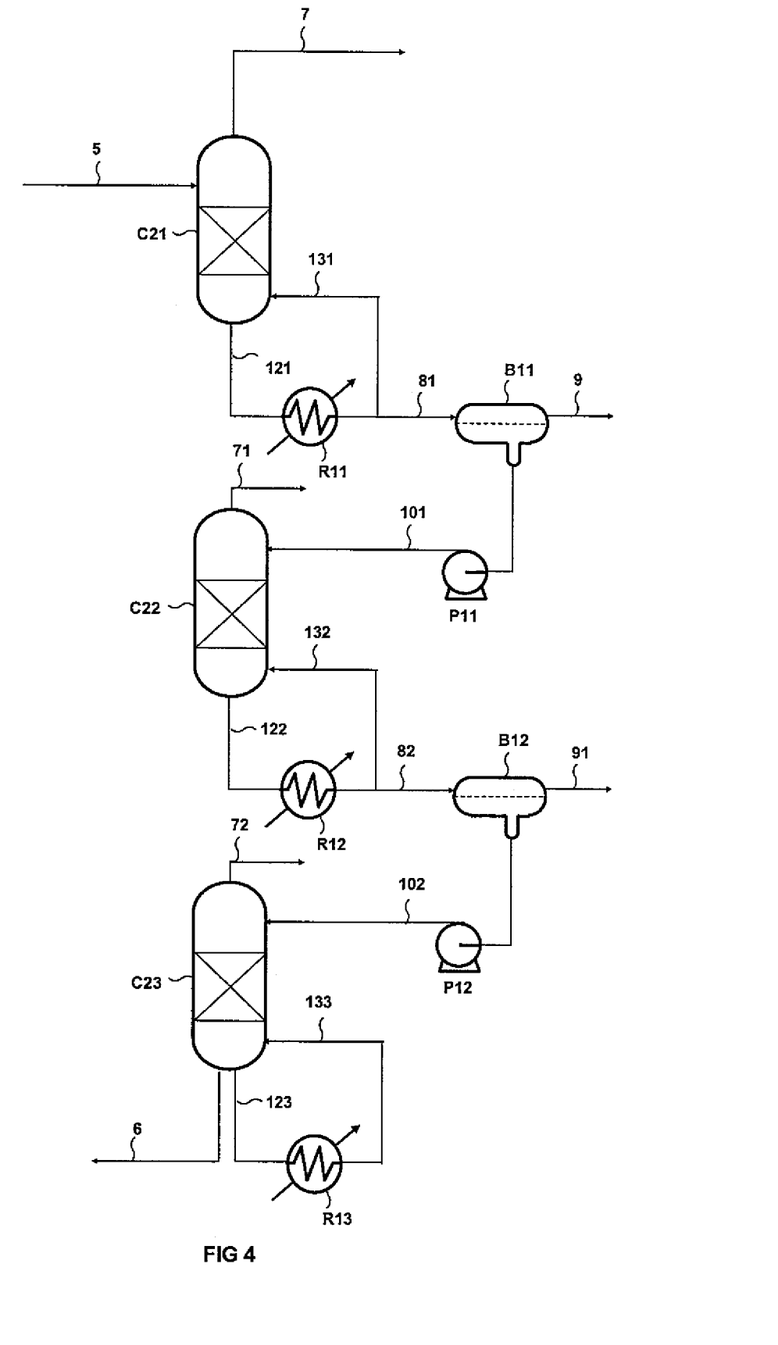

It is also possible to use several regeneration columns in order to perform regeneration with absorbent solution withdrawal upon transfer of the absorbent solution from one column to the next. In FIG. 4, column C2 used in the processes described in connection with FIGS. 1, 2 and 6 is replaced by three columns C21, C22 and C23 in order to perform two absorbent solution withdrawals. Said columns C21, C22 and C23 are equipped with gas/liquid contacting means. The reference numbers of FIG. 4 identical to those of FIGS. 1 and 2 designate the same elements. Without departing from the scope of the present invention, column C2 can be replaced by two columns, three columns as shown in FIG. 4, or more.

The absorbent solution flowing in through line 5 is fed into column C21. The gas fraction released in C21 is discharged through line 7. The partly regenerated absorbent solution obtained at the bottom of column C21 is sent through line 121 to be heated by reboiler R11. A portion of the absorbent solution from R11 is sent back to column C21 through line 131. The remaining absorbent solution portion is fed through line 81 into separating drum B11. Line 9 allows to discharge from B11 a solution fraction depleted in acid compounds. Line 101 sends the absorbent solution fraction laden with acid compounds to column C22.

The gas fraction released in C22 is discharged through line 71. A portion of the absorbent solution from R12 is sent back to column C22 through line 132. The remaining absorbent solution portion is fed through line 82 into separating drum B12. Line 91 allows to discharge from B12 a solution fraction depleted in acid compounds. Line 102 sends the absorbent solution fraction laden with acid compounds to column C23.

The gas fraction released in C23 is discharged through line 72. The partly regenerated absorbent solution obtained at the bottom of column C22 is sent through line 122 to be heated by reboiler R12, then it is fed through line 133 into column C23.

The regenerated absorbent solution is obtained and discharged at the bottom of C23 through line 6 prior to being sent to absorption column C1.

The regeneration carried out according to the diagram of FIG. 4 allows to discharge two absorbent solution fractions through lines 9 and 91. The absorbent solution fraction depleted in acid compounds discharged through line 91 is assembled with the fraction circulating in line 9 in order to be sent to column C1.

In the process described in reference to FIG. 4, each one of the columns can optionally operate at different pressures. In reference to FIG. 4, in cases where the pressure is higher in C23 than in C22, and higher in C22 than in C21, the pressure of the liquids supplied to the columns is increased by means of pumps P11 and P12. As the absorbent solution is being regenerated, and thanks to demixing between the columns, the absorbent solution becomes depleted in amine, thus allowing regeneration at a higher temperature and therefore higher pressure. This specific configuration of the method according to the invention is advantageous in cases where streams 7, 71 and 72 are to be compressed in a later stage of the method, for example in the case of later liquefaction of these streams. In other words, column C21 works at a pressure P1. After separation in drum B11, the fraction laden with acid compounds is compressed through pump P11 to a pressure P2, then the fraction laden with acid compounds at pressure P2 is fed into column C22. Column C22 works at pressure P2. Thus, gas 7 released at the top of C21 is at a pressure P1 lower than pressure P2 of gas 71 released at the top of C22. Similarly, if there is a column C23, it can work at a pressure P3 higher than P2 through pumping by P12. Furthermore, column C22 can work at a higher temperature than column C21. Similarly, column C23 can work at a higher temperature than column C22.

Figure 5:
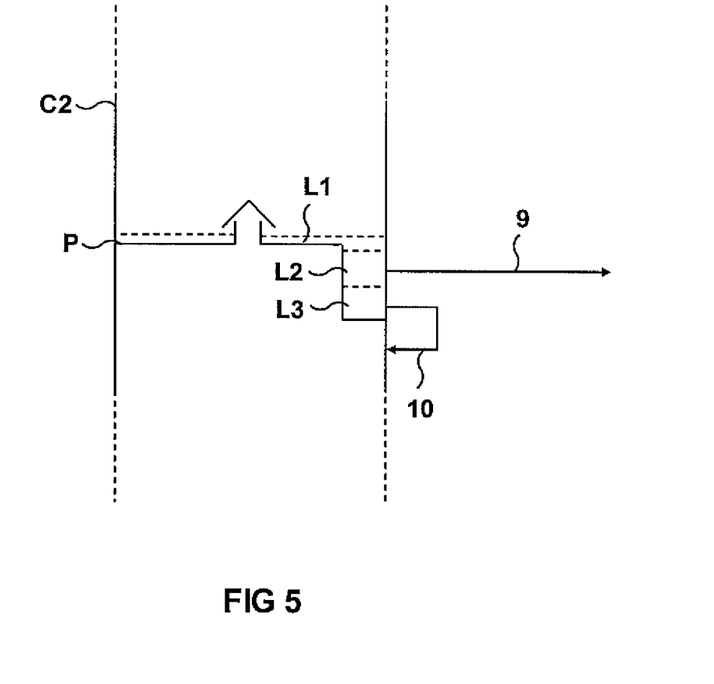

FIG. 5 diagrammatically shows another embodiment of column C2 used in the processes described in reference to FIGS. 1, 2 and 3, wherein the separation stage is carried out by a means arranged within column C2. In connection with FIG. 5, absorbent solution L1 in emulsion is collected on tray P equipped with a downcomer wherein the absorbent solution decants. The two fractions L2 and L3 can then be respectively withdrawn through lines 9 and 10 in order to be either re-injected at a lower point of the column (line 10), or sent back to the absorption zone (line 9).

The method and its advantages according to the present invention are illustrated by the operating examples below.

In Examples 1, 2 and 3, post-combustion decarbonation of the fumes is carried out using an aqueous 35 wt. % TMHDA solution that has collected 2.5 mole $CO_2$ per kilogram of absorbent solution in the bottom of the absorption column. This absorbent solution is sent to the regeneration column having an average temperature of 90° C., above the critical temperature of the aqueous TMHDA solution. The absorbent solution flow rate is 1000 kg/h.

EXAMPLE 1

In a conventional embodiment, i.e. a method according to FIG. 1 wherein regeneration column C2 comprises a single contacting zone and no withdrawal line 8, the entire absorbent solution stream circulating in absorption column C1 also circulates in regeneration column C2. From the bottom to the top of regeneration column C2, the absorbent solution becomes increasingly depleted in $CO_2$, reaching a zero $CO_2$ concentration at the bottom of C2. The absorbent solution thus regenerated is sent back to the top of column C1.

EXAMPLE 2

In an embodiment of the method according to FIG. 1, wherein the $CO_2$-poor phase is withdrawn when it represents 20 mass % of the total absorbent solution stream, withdrawal is carried out when the overall $CO_2$ concentration reaches 1.2 mole $CO_2$ per kilogram of absorbent solution at the bottom of zone Z1. After liquid-liquid separation in B1, a 200 kg/h stream containing no $CO_2$ is sent through line 9 to the top of absorption column C1 and a 800 kg/h stream with a $CO_2$ concentration of 1.5 mole per kilogram of absorbent solution is sent to zone Z2 through line 10.

EXAMPLE 3

In an embodiment of the method according to FIG. 3, where a $CO_2$-poor phase is withdrawn when it represents 10 wt. % of the total stream, three withdrawal operations are carried out.

The first withdrawal is performed through line 81 when the overall $CO_2$ concentration reaches 2.1 moles $CO_2$ per kilogram of absorbent solution at the bottom of zone Z1. After liquid-liquid separation in B11, a 100 kg/h stream containing no $CO_2$ is then sent to the top of absorption column C1 through line 9 and a 900 kg/h stream having a $CO_2$ concentration of 2.3 moles per kilogram of absorbent solution is sent to zone Z2 through line 101.

The second withdrawal is carried out through line 82 when the overall $CO_2$ concentration reaches 1.5 mole $CO_2$ per kilogram of absorbent solution at the bottom of zone Z2. After liquid-liquid separation in B12, a 90 kg/h stream of absorbent solution containing no $CO_2$ can then be sent to the top of absorption column C1 through line 91 and a 810 kg/h stream having a $CO_2$ concentration of 1.63 mole per kilogram of absorbent solution is sent to zone Z3 through line 102.

The third withdrawal is carried out through line 83 when the overall $CO_2$ concentration reaches 0.8 mole $CO_2$ per kilogram of absorbent solution at the bottom of zone Z3. After liquid-liquid separation in B13, a 81 kg/h stream of absorbent solution containing no $CO_2$ can then be sent to the top of absorption column C1 through line 92 and a 729 kg/h stream having a $CO_2$ concentration of 0.89 mole per kilogram of absorbent solution is sent to zone Z4 through line 103.

Examples 1 to 3 highlight the significance of a method using demixing and separation of the absorbent solution during regeneration. In fact, carrying out one or more liquid-liquid separations allows to reduce the absorbent solution stream in regenerator C2 and a $CO_2$-richer absorbent solution is regenerated, which facilitates regeneration.

EXAMPLE 4

The gas to be treated is described in the table below:

| Composition (mol %) | Stream 1 |
|---|---|
| CO2 | 0.3 |
| N2 | 0.63 |
| H2O | 0.7 |
| Temperature (° C.) | 30 |
| Pressure (bar) | 1 |
| Gas flow rate (t/h) | 2520 |
| CO2 flow rate (t/h) | 1036 |

The method uses an absorbent solution with 50 wt. % TMHDA and captures 95% of the $CO_2$ contained in stream 1.

In a configuration (1) known from the state of the art, the regeneration column comprises a single regeneration section and no absorbent solution withdrawal is performed, no phase separation is taken into account. In other words, configuration (1) corresponds to a method according to FIG. 1 wherein regeneration column C2 comprises a single contacting zone and no withdrawal line 8.

By way of comparison, configuration (2) corresponds to the method according to FIG. 1. Column C2 comprises two regeneration sections Z1 and Z2, the absorbent solution is withdrawn from tray P, separated in B1, stream 9 being sent back to C1 after being cooled in E3, and stream 10 being sent back to C2 so as to continue regeneration.

Configuration (3) corresponds to the method according to FIG. 6. Compared to configuration (2), stream 9 is cooled in E3 by thermal exchange with the laden absorbent solution, which acts as preheating for column C2. This thermal integration allows to increase the energy gain of the method.

The following table shows the regeneration energy consumed in each configuration (1), (2) and (3):

| Configuration | 1 | 2 | 3 |
|---|---|---|---|
| Regeneration power (MW) | 872 | 820 | 750 |
| Gain (%) | — | 6% | 14% |

Example 4 clearly shows the advantage provided by the method according to the invention that allows a high energy gain on the absorbent solution regeneration heat.

EXAMPLE 5

In Example 5, the gas to be treated, the performances and configuration (1) remain identical to those of Example 4.

Configuration (4) corresponding to the method according to FIG. 4 comprises two columns operating at different pressures (in configuration (4), column C23 of FIG. 4 is not implemented). C21 operates at 2.5 bars and 125° C. with a 50 wt. % absorbent solution, similarly to the regeneration column in configuration (1). After phase separation, the absorbent solution only contains 33 wt. % TMHDA, which allows regeneration to be continued in C22 at a higher temperature. C22 operates at 8 bars and 160° C. with a 33 wt. % absorbent solution.

The table below shows the results of configuration (4) in comparison with configuration (1), without absorbent solution demixing and in a single regeneration column.

| Configuration | 1 | 4 |
|---|---|---|
| Regeneration power (MW) | 872 | 740 |
| Gain (%) | — | 15% |
| CO2 at 2.5 bars (t/h) | 986 | 494 |
| CO2 at 8 bars (t/h) | 0 | 492 |

Example 5 shows the energy advantage of configuration (4) with 2 regeneration columns (15% gain). A second advantage of this configuration is that it allows to obtain 50 wt. % of the $CO_2$ stream at a higher pressure (8 bars instead of 2.5 bars). From the viewpoint of $CO_2$ stream compression, for transportation for example, the gain in the downstream compression section will be quite notable.

The invention claimed is:

1. A method of deacidizing a gaseous effluent comprising at least one acid compound of the group made up of hydrogen sulfide and carbon dioxide wherein the gaseous effluent is contacted with an absorbent solution in a contacting zone so as to obtain gaseous effluent depleted in acid compounds and an absorbent solution laden with acid compounds, the absorbent solution being selected for its property of forming two separable liquid phases when it has absorbed an amount of acid compounds and it is heated, and wherein the absorbent solution laden with acid compounds is regenerated by carrying out the following stages:
    a) distilling at least part of the absorbent solution laden with acid compounds in a first regeneration zone so as to produce a partly regenerated absorbent solution,
    b) withdrawing at least part of the partly regenerated absorbent solution from the first regeneration zone and separating the solution withdrawn into a fraction enriched in acid compounds and a fraction depleted in acid compounds,
    c) distilling said fraction enriched in acid compounds obtained in stage b) in a second regeneration zone so as to produce a regenerated absorbent solution,
    wherein, in stage c), at least one complementary stage of withdrawing at least part of the absorbent solution circulating in the second regeneration zone is carried out, the absorbent solution withdrawn is separated into a liquid enriched in acid compounds and a liquid depleted in acid compounds, the liquid depleted in acid compounds being recycled to the contacting zone and the liquid enriched in acid compounds being fed again into the second regeneration zone, and
    d) recycling at least said fraction depleted in acid compounds and said regenerated absorbent solution to the contacting zone.

2. A method as claimed in claim 1, wherein the first regeneration zone is arranged in a first column and the second regeneration zone is arranged in a second column.

3. A method as claimed in claim 1, wherein the absorbent solution is distilled in the first regeneration zone and in the second regeneration zone so as to produce a regenerated absorbent solution depleted in acid compounds by releasing acid compounds in gaseous form.

4. A method of deacidizing a gaseous effluent comprising at least one acid compound of the group made up of hydrogen sulfide and carbon dioxide, wherein the gaseous effluent is contacted with an absorbent solution in a contacting zone so as to obtain a gaseous effluent depleted in acid compounds and an absorbent solution laden with acid compounds, the absorbent solution being selected for its property of forming two separable liquid phases when it has absorbed an amount of acid compounds and it is heated, and wherein the absorbent solution laden with acid compounds is regenerated by carrying out the following stages.
    a) distilling at least part of the absorbent solution laden with acid compounds in first regeneration zone so as to produce a partly regenerated absorbent solution,
    b) withdrawing at least part of the partly regenerated absorbent solution from the first regeneration zone and separating the solution withdrawn into a fraction enriched in acid compounds and a fraction depleted in acid compounds,
    c) distilling said fraction enriched in acid compounds obtained in stage b) in a second regeneration zone so as to produce a regenerated absorbent solution,
    wherein, prior to stage c), the pressure of said fraction enriched in acid compounds is increased by pumping, and d) recycling least said fraction depleted in acid compounds and said regenerated absorbent solution to the contacting zone.

5. A method of deacidizing a gaseous effluent comprising at least one acid compound of the group made up of hydrogen sulfide and carbon dioxide wherein the gaseous effluent is contacted with an absorbent solution in a contact n zone so to obtain gaseous effluent depleted in acid compounds and an absorbent solution laden with acid compounds the absorbent solution being selected for its property of forming two separable liquid phases when it has absorbed an amount of acid compounds and it is heated, and wherein the absorbent solution laden with acid compounds is regenerated by carrying out the following stages:
    a) distilling at least part of the absorbent solution laden with acid compounds in a first regeneration zone so as to produce a partly regenerated absorbent solution,
    b) withdrawing at least part of the partly regenerated absorbent solution from the first regeneration zone and se in the solution withdrawn into a fraction enriched in acid compounds and a fraction depleted in acid compounds,
    c) distilling said fraction enriched in acid compounds obtained in stage b) in a second regeneration zone so as to produce a regenerated absorbent solution,
    wherein the second regeneration zone operates at a higher temperature than the first regeneration zone, and
    d) recycling at least said fraction depleted in acid compounds and said regenerated absorbent solution to the contacting zone.

6. A method as claimed in claim 1, wherein the contacting zone consists of a column provided with means for contacting a gas and a liquid and wherein, in stage d), the fraction depleted in acid compounds and the regenerated absorbent solution are introduced at the top of the column.

7. A method as claimed in claim 1 wherein, in stage b), one of the following separation techniques is used: decantation, centrifugation, filtration.

8. A method as claimed in claim 1, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

9. A method as claimed in claim 1, wherein the gaseous effluent is selected from the group consisting of natural gas, synthesis gas, combustion fumes, refinery gas, Claus tail gas, and biomass fermentation gas.

10. A method as claimed in claim 4, wherein the first regeneration zone is arranged in a first column and the second regeneration zone is arranged in a second column.

11. A method as claimed in claim 4, wherein the absorbent solution is distilled in the first regeneration zone and in the second regeneration zone so as to produce a regenerated absorbent solution depleted in acid compounds by releasing acid compounds in gaseous form.

12. A method as claimed in claim 4, wherein the contacting zone consists of a column provided with means for contacting a gas and a liquid and wherein, in stage d), the fraction depleted in acid compounds and the regenerated absorbent solution are introduced at the top of the column.

13. A method as claimed in claim 4 wherein, in stage b), one of the following separation techniques is used: decantation, centrifugation, filtration.

14. A method as claimed in claim 4, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

15. A method as claimed in claim 4, wherein the gaseous effluent is selected from the group consisting of natural gas, synthesis gas, combustion fumes, refinery gas, Claus tail gas, and biomass fermentation gas.

16. A method as claimed in claim 5, wherein the first regeneration zone is arranged in a first column and the second regeneration zone is arranged in a second column.

17. A method as claimed in claim 5, wherein the absorbent solution is distilled in the first regeneration zone and in the second regeneration zone so as to produce a regenerated absorbent solution depleted in acid compounds by releasing acid compounds in gaseous form.

18. A method as claimed in claim 5, wherein the contacting zone consists of a column provided with means for contacting a gas and a liquid and wherein, in stage d), the fraction depleted in acid compounds and the regenerated absorbent solution are introduced at the top of the column.

19. A method as claimed in claim 5 wherein, in stage b), one of the following separation techniques is used: decantation, centrifugation, filtration.

20. A method as claimed in claim 5, wherein the absorbent solution comprises a reactive compound in aqueous phase, the reactive compound being selected from the group consisting of: amines, alkanolamines, polyamines, amino-acids, amino-acid alkaline salts, amides, ureas, alkali metal phosphates, carbonates and borates.

21. A method as claimed in claim 5, wherein the gaseous effluent is selected from the group consisting of natural gas, synthesis gas, combustion fumes, refinery gas, Claus tail gas, and biomass fermentation gas.

* * * * *